G. H. McDONALD.
SPRING SUPPORT FOR VEHICLES.
APPLICATION FILED FEB. 12, 1917.
1,257,505.
Patented Feb. 26, 1918.
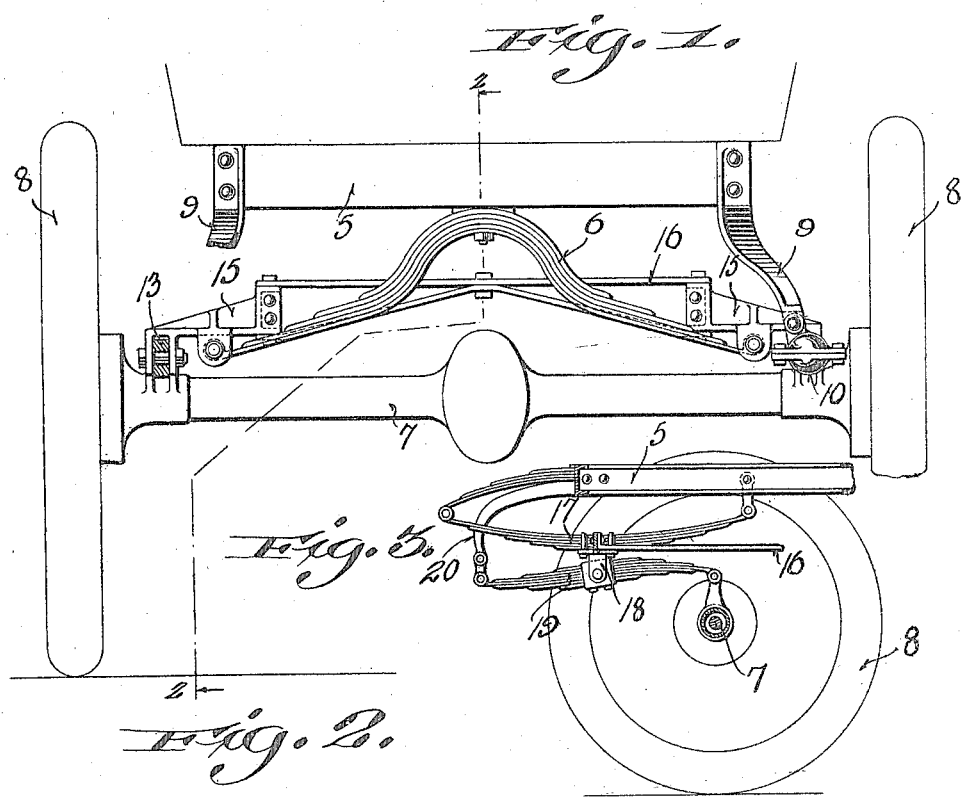
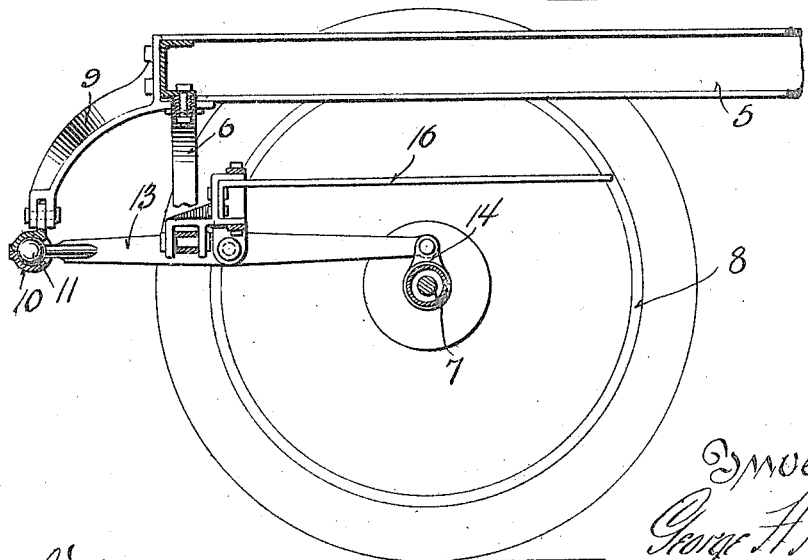

UNITED STATES PATENT OFFICE.

GEORGE H. McDONALD, OF MILWAUKEE, WISCONSIN.

SPRING-SUPPORT FOR VEHICLES.

1,257,505.  Specification of Letters Patent.  Patented Feb. 26, 1918.

Application filed February 12, 1917. Serial No. 148,045.

*To all whom it may concern:*

Be it known that I, GEORGE H. McDONALD, a citizen of the United States, and resident of Milwaukee, in the county of Milwaukee and State of Wisconsin, have invented certain new and useful Improvements in Spring-Supports for Vehicles; and I do hereby declare that the following is a full, clear, and exact description thereof.

My invention relates to new and useful improvements in spring supports for vehicles.

It is primarily the object of my invention to provide a spring support wherein compensation is had for the lifting tendency normally exerted by the springs on the body of the vehicle due to engagement of an obstruction by the wheels.

It is further an object to provide a compensating spring support of this nature which is of comparatively simple construction, and which may be associated with various types of automobiles now in use, in a manner requiring but slight modification of the structure thereof.

With the above and other objects and advantages in view, the invention resides more particularly in the novel combination, formation and arrangement of parts hereinafter described and pointed out in the appended claims.

In the drawings:

Figure 1 is a rear elevational view of an automobile provided with my improved spring support for the body thereof.

Fig. 2 is a transverse sectional view through the rear portion of the automobile on the line 2—2 of Fig. 1.

Fig. 3 is a view similar to Fig. 2 but showing a modified form of spring support.

Referring now more particularly to the accompanying drawings, 5 designates the chassis of an automobile, to the rear end of which is secured a transversely disposed set of leaf springs 6 of conventional type, and 7 designates the usual rear axle of the automobile, carrying the wheels 8.

My improved spring support comprises a pair of arms 9 depending from the rear corners of the chassis and inclined outwardly therefrom. These arms carry sockets 10 at their lower ends in which are disposed ball heads 11 at the rear ends of a pair of forwardly extending levers 13 which have their forward ends pivoted to upstanding ears 14 on the ends of the axle. The levers are intermediately pivoted to depending ears carried by outstanding arms 15 at the rear corners of a supplemental frame 16 disposed under the main frame, or body of the vehicle, and the ends of the set of leaf springs 6 are also pivoted to these arms. The front axle structure of the automobile, (not shown) is associated with the forward end of the frame and the usual forward front springs in the manner described in connection with the rear axle. Thus the supplemental frame 16 serves to hold all of the wheel carrying levers in proper relative position.

In Fig. 3 a slightly modified form of support is shown wherein longitudinal sets of springs 17 of conventional type are employed, and each of these sets of springs is secured at its central portion to one corner of the supplemental frame 16 and this frame is provided at its corners with depending ears 18 similar to the ears of the arms 15 of the structure shown in Figs. 1 and 2 to each of which is pivoted the central portion of a spring lever bar 19 formed of a set of leaf springs and pivoted at its rear end to an arm 20 extending from the chassis in the manner of the arms 9 of structure of the Figs. 1 and 2, and pivoted at its front end to the rear axle 7. Thus, the minor shocks incidental to travel are taken up directly by the spring lever bars 19.

In operation, referring now more particularly to Fig. 2, it is seen that upward movement of the wheel due to engagement with an obstruction, will tend to rock the lever 13 on the spring carried frame 16 as a pivot coincident to yielding movement of the spring. Thus, coincident with the normal upward tendency of movement imparted to the body by the spring, there is also imparted a downward pulling movement by the arms 9 and thus a compensation for the upward movement of the springs is provided which tends to retain the body of the car in its normal position. As shown more particularly in Fig. 2, the depending arm 9 is preferably hinge jointed to provide for flexure thereof transversely of the automobile to permit the usual desired side play. Although I have described the wheel carrying levers 13 as pivoted to a frame which is connected with the springs, it is noted that this structure comprises essentially a pivotal connection for the springs with the intermediate portions of the levers.

It is further understood that various changes and modifications of structure may be employed to meet differing conditions of use, without departing in any manner from the spirit of my invention, or exceeding the scope of the appended claims.

What is claimed is:

1. The combination with a vehicle body, of levers pivotally connected therewith, ground wheels carried by said levers, a supplemental frame pivotally connected with the levers at points between the body connections of the levers and the wheels and spring means connecting the supplemental frame and the body of the vehicle.

2. The combination with a vehicle body, of arms depending therefrom, a supplemental frame disposed under the body, levers intermediately pivoted to said frame, universal pivotal connections between certain ends of the levers and the depending arms of the vehicle body, ground wheels carried on the other ends of the levers, and spring means connecting the supplemental frame and the vehicle body.

3. The combination with a vehicle body, of arms extending outwardly and downwardly therefrom, a socket formed on the outer end of each arm, levers having ball heads formed on the outer ends thereof and pivotally secured in said sockets, ground wheels carried by the inner ends of said levers, and spring means connected with the vehicle body and with the levers between their pivotal connections and the wheels.

In testimony that I claim the foregoing I have hereunto set my hand at Milwaukee, in the county of Milwaukee and State of Wisconsin, in the presence of two witnesses.

GEORGE H. McDONALD.

Witnesses:
   FRANK S. RATCLIFFE,
   JENNIE BLYE.

Copies of this patent may be obtained for five cents each, by addressing the "Commissioner of Patents, Washington, D. C."